United States Patent [19]

Stevens

[11] Patent Number: 4,654,521
[45] Date of Patent: Mar. 31, 1987

[54] SELF MEASURING ILLUMINATION DEVICE

[75] Inventor: Carl C. Stevens, Rochester, N.Y.

[73] Assignee: Eastman Kodak Company, Rochester, N.Y.

[21] Appl. No.: 776,274

[22] Filed: Sep. 16, 1985

[51] Int. Cl.⁴ .............................................. H01J 5/16
[52] U.S. Cl. ................................... 250/227; 250/228; 362/362
[58] Field of Search ................... 250/227; 356/218; 358/54, 55; 362/362

[56] References Cited

U.S. PATENT DOCUMENTS

| | | | |
|---|---|---|---|
| 2,506,672 | 5/1950 | Kell et al. | 250/7 |
| 3,163,080 | 12/1964 | Miller | 88/24 |
| 3,222,522 | 12/1965 | Birkebale | 250/228 X |
| 3,949,226 | 4/1976 | Dugan et al. | 250/354 |
| 3,982,123 | 9/1976 | Goell et al. | 250/227 |
| 4,103,154 | 7/1978 | d'Auria et al. | 250/227 |

Primary Examiner—Eugene R. Laroche
Assistant Examiner—James C. Lee
Attorney, Agent, or Firm—John B. Turner

[57] ABSTRACT

An illumination device is disclosed which includes a lamp for producing light. Light from the lamp enters the input end of a cuboidal integrating bar formed of material having a refractive index greater than $\sqrt{2}$. The edges of the output end of the bar are rendered imperfect by blunting. Light escaping the bar, other than through the output end of the bar, by virtue of the imperfections, is detected by a photosensitive device in a space within a housing around the bar. The housing has inlet and outlet apertures such that light cannot enter the space in the housing other than through the bar. The imperfections are masked so that light cannot enter the bar through the imperfections. The photosensitive device produces a signal indicative of the useful light output of the bar, which signal is not influenced by light entering the output end of the bar.

7 Claims, 3 Drawing Figures

SELF MEASURING ILLUMINATION DEVICE

BACKGROUND OF THE INVENTION

1. Technical Field

This invention relates to an illumination device which includes a detector for producing a signal indicative of the light output of the device and which signal is independent of light incident on the device from the exterior of the device.

2. Background Art

U.S. patent application Ser. No. 742,358, filed June 7, 1985 in the name of D. L. Funston describes illumination control circuitry for a film video player electronic strobe light. The film video player therein described includes an electronic strobe light operable for repetitively firing a flash tube to flash illuminate a solid state image sensor via a pulse of light projected onto a photographic film at the vertical retrace rate of a standard television signal. Detector circuitry, responsive to a signal relating to an output of the image sensor, produces a control signal that is functionally related to whether or not the illumination of the image sensor is above, below, or within a predetermined range near the saturation level of the image sensor. A microprocessor adjusts an exposure level at the vertical retrace rate in accordance with the control signal. Logic switching circuitry, having an input coupled to the microprocessor and responsive to the exposure level signal and an output coupled to the electronic strobe light, causes the electronic strobe light to produce a pulse of light within each vertical retrace interval that is sufficient to illuminate the image sensor near its saturation level without the illumination saturating the sensor, to optimize the signal-to-noise ratio of the image sensor.

The light source described in the aforesaid prior application includes a Xenon flash tube positioned adjacent a reflector, arranged for directing light from the flash tube onto a light integrator, which is formed of a solid bar of transparent material. A diffuser at the output of the integrator functions to spread the light so that there are no illumination discontinuities over the film plane, as such discontinuities may result in either light or dark "bands" being visible on the video monitor. A photosensor, such as a photodiode, produces a light-dependent signal corresponding to the intensity of light from the flash tube. For that purpose, the photosensor is positioned to receive light reflected from the surface of the diffuser. Because light reflected from the film varies with the density of the negative, the photosensor is located, or its viewing angle is restricted, so that light reflected from the film does not impinge on the photosensor.

SUMMARY OF THE INVENTION

The present invention provides an illumination device which more effectively meets the criteria of avoiding impingement of light reflected from the film on the photosensor than does the arrangement described and illustrated in the afore-mentioned U.S. patent application Ser. No. 742,358.

An illumination device for use with a lamp, in accordance with the present invention includes a cylindrical integrator bar having a longitudinal axis and input and output ends which are planar and perpendicular to the longitudinal axis. The bar is so disposed that it receives at its input end light from the lamp. The refractive index of the material of the integrator bar is greater than $\sqrt{2}$ so that any light which enters the input end of the bar either travels directly to the output end of the bar or is totally internally reflected within the bar so that it is incident on the output end of the bar.

At least a portion of an edge bounding the output end of the bar is rendered imperfect. Light within the bar which is incident on the imperfection may exit the bar through the imperfection or through a side facet of the bar after reflection internally at the imperfection. In essence, the imperfection constitutes a surface at which light can be internally reflected, or at which light can be refracted out of the bar by virtue of its angle of incidence on the surface at the imperfection being less than the critical angle.

An opaque housing is disposed around the bar and bounds a space outside the bar. The housing has inlet and outlet apertures allowing light from the lamp to enter the bar, and allowing light leaving the output end of the bar to leave the housing. The housing is sealed to the bar at its input and output ends whereby light passing through the inlet aperture or the outlet aperture cannot enter the space outside the bar within the housing other than through the bar.

Means are provided for masking the output end of the bar so that any light entering the outlet aperture is not incident on the imperfection. Such masking means prevent light impinging upon the imperfection and entering the bar at such an angle that it subsequently has an angle of incidence on the glass-air interface less than the critical angle. Any such light having an angle of incidence less than the critical angle would, by definition, be refracted out of the glass into the space within the housing.

Means are provided for detecting light in the space within the housing which has left the bar by virtue of its incidence on the imperfection. The detection means creates a signal indicative of the intensity of the detected light because the intensity of the detected light has a fixed relationship to the intensity of the light exiting the output end of the bar.

In one embodiment of the invention in which the bar is parallelepipedal, all four edges at the output end of the bar are imperfect. This is convenient in manufacture so that orientation of the bar relative to the photosensitive device is not critical. The photosensitive device is so positioned as to view one of the imperfect edges.

In another embodiment of the invention, a portion of the housing adjacent said outlet aperture constitutes the means masking the output end of the bar. This enhances simplicity of manufacture.

BRIEF DESCRIPTION OF THE DRAWINGS

An embodiment of the present invention will now be described, by way of example, with reference being made to the accompanying drawings, in which.

BEST MODE OF CARRYING OUT THE INVENTION

Figure 1:
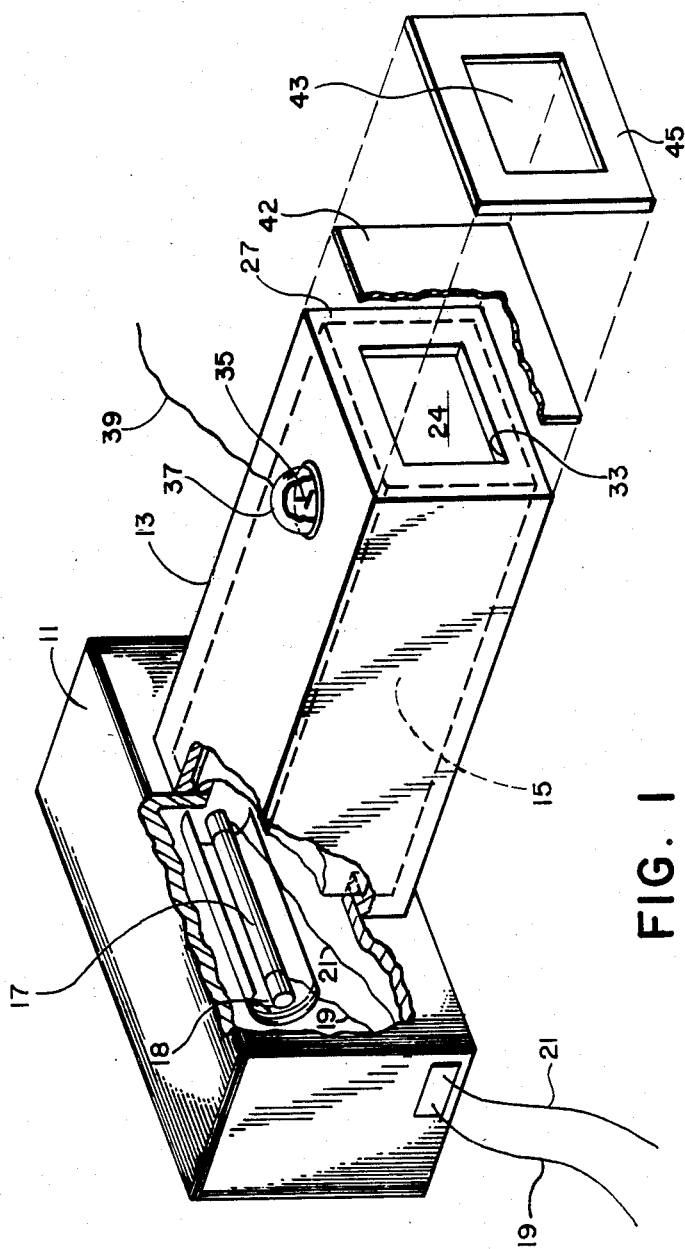
FIG. 1 is a view of an illumination device, embodying the present invention, and a diffuser and a negative to be illuminated, the negative and diffuser being displaced from the positions they would have in use, for the sake of illustration; the device including a lamp house, an integrator bar and an integrator bar housing.
Figure 2:
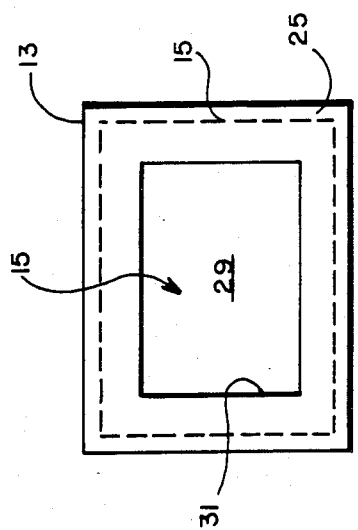
FIG. 2 is a view of the end of the integrator bar housing as seen from inside the lamp house.

FIG. 1 illustrates an illumination device, in accordance with the invention, comprising a lamp house 11 and an opaque housing 13 for an integrator bar 15. Within the lamp house 11 there is a strobe lamp 17, supplied with electricity along leads 19 and 21, and a reflector 18 behind the lamp 17.

Figure 3:
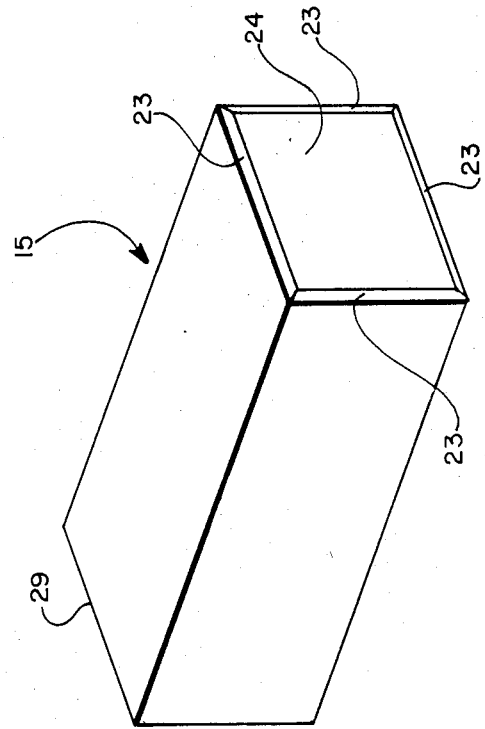
FIG. 3 is a view of the integrator bar showing blunted edges at its end remote from the lamp house.

FIG. 3 illustrates the integrator bar 15 which is cylindrical, i.e. its surface, other than that of its ends, is traced by a straight line moving parallel to a fixed straight line and intersecting a fixed curve, and its ends are planar and perpendicular to the aforesaid fixed straight line. In the present embodiment the bar is a rectangular parallepiped which is sometimes termed a cuboid. The six facets of the bar 15 are polished. The four edges at the input end 29 of the bar and the four edges extending between the input end 29 and the output end 24 of the bar are as sharp as is normal in an integrator bar; i.e., they are substantially perfect. The four edges 23 at the output end of the bar are, however, blunted; i.e., they are imperfect. The imperfection, that is, the blunting of the four edges, may be created by abrasion and serves to allow light to escape the bar laterally of the bar as will be more fully described herein.

The length of the integrator bar housing 13 is such that its end walls 25, 27 contact and seal with the input and output ends 29, 24, respectively, of the bar. The input and output end walls 25, 27 of the housing have inlet and outlet apertures 31, 33, respectively, therein. The apertures 31, 33 are each of smaller cross section than the bar so that light cannot enter the housing other than through the bar. The output end wall aperture 33 is so sized that it extends onto the plano end surface of the bar and thereby masks the blunted edges 23 bounding the end 24 so that light from outside the housing cannot reach the blunted edges 23. Thus, the output end wall of the housing constitutes masking means for masking the output end of the bar.

The cross section of the opaque housing 13 is such that there is space between the walls of the housing and the integrator bar intermediate the input and output ends. A photosensitive device 35, such as a photodiode, is so disposed as to be sensitive to light which is both outside the integrator bar 15 and within the housing 13 and which is adjacent the output end of the bar. In the present embodiment, the photosensitive device has a viewing angle of 90° and is so disposed, in an opaque bulge 37 of the housing, that it can view the greater portion of one blunted edge 23.

The photosensitive device 35 has extending from it electrical leads 39 for transmitting a signal indicative of the intensity of light incident on the device 25.

Also illustrated in FIG. 1 is a diffuser 42 disposed between the output end of the housing and a negative 43 carried in a negative carrier 45. The negative and carrier are shown displaced from the diffuser and the diffuser is shown displaced from the end of the housing, for the purpose of illustration. In normal use, the diffuser abuts the housing and the negative, in its carrier, is close adjacent the diffuser. The diffuser performs its known role of suppressing the effect of minor scratches and blemishes on the negative, and of reducing any lack of uniformity that may exist in the intensity of light exiting the bar.

The refractive index of the glass forming the integrator bar is greater than $\sqrt{2}$. Thus, any light which enters the bar will be totally internally reflected within the bar, or will pass un-reflected along the length of the bar, and will exit through the output end of the bar, and emerge through the outlet aperture of the housing. No light is refracted out of the bar through the side facets of the bar extending between the input and output ends. However, light which is incident on the imperfections, that is the blunted edges 23 bounding the output end of the bar, is either refracted out of the bar by virtue of its angle of incidence on the surface of the imperfection being less than the critical angle or is internally reflected and subsequently refracted out of the bar by virtue of its angle of incidence on the glass/air surface being then less than the critical angle. Thus, the blunted edges consititute a means for getting some light out of the bar laterally. The amount of such light bears a constant relationship to the amount of light leaving the output end of the bar for illuminating the negative. The amount of such light escaping the bar laterally is also directly related to the instantaneous output of the lamp.

Some of the light escaping the bar within the housing reaches the photosensitive device 35 and the amount of light reaching the device 35 bears a constant relationship to the amount of light exiting the bar within the housing. Thus, the signal from the device along the leads 39 is indicative of the amount of light leaving the output end of the bar for illuminating the negative.

Most importantly, the signal provided by the photosensitive device is not influenced by light reflected by the negative back into the bar. The intensity of such reflected light would vary due to variations in the densities of successive negatives illuminated by the light source, and hence, if sensed, would cause erroneous intensity signals. Any light so reflected and entering the bar cannot be incident on the blunted edges 23 of the output end of the bar because they are masked by the overlapping output end of the housing and because such light cannot reach the blunted edges through the glass of the bar. Any light reflected by the negative into the bar travels along the bar and exits through the input end of the bar.

The blunting of the edges 23 of the output end 24 of the integrator bar has been described as creating an imperfection. Anyone who has looked into a common integrator bar will have noticed that its edges appear, when viewed through the material of the bar, as bright lines. This is because the edges are not perfect. In that the edges are not perfect they do cause some loss of light out of the bar either through the edge or upon a subsequent incidence on a facet at an angle less than the critical angle, after internal reflection at the edge. The photosensitive device is positioned adjacent the output end of the bar so that light reaching it by virtue of the imperfection created on the edge or edges of the output end of the bar strongly predominates over light emerging from the bar by virtue of the lack of perfection of the other edges of the bar. Also, the magnitude of the purposefully created imperfection is such that light reaching the photosensitive device by virtue of the created imperfection strongly predominates over any light emerging from the bar by virtue of incidence on the other edges.

As is described in the aforementioned U.S. patent application Ser. No. 743,358, the signal from the photosensitive device 35 is applied to illumination logic circuitry together with signals supplied by a control system, to control the lamp 17 so that a desired substantially constant amount of flash light is produced during each firing of the lamp 17.

In the present embodiment, all four edges bounding the output face of the bar are blunted; i.e., provided with imperfections. This is for conveneience of manufacture. However, only a portion of one edge, to be disposed in sight of the photosensitive device, need have an imperfection.

In the present embodiment, the edges bounding the output face of the bar have been rendered imperfect by blunting. It will lbe understood that the desired imperfection could be created in other ways, for example, sand blasting or chipping, or in those cases wherein the bar is molded, it could be molded in.

In the embodiment specifically described herein, the lamp is a strobe tube. Other embodiments of the present invention may include other sources of light energy, such as incandescent lamps.

Also, in the embodiment specifically described herein, the signal from the photosensitive device is applied to illumination logic circuitry wherein it is used for controlling automatically the amount of useful light produced. However, the signal could be applied to a meter read by an operator who manually controls the energy applied to the lamp in order to control the useful output of the bar. Such an embodiment might be useful when the lamp is an incandescent lamp and the effect of the slow darkening of the glass of the lamp, by vaporized filament material, has to be overcome.

I claim:

1. An illumination device for use with a lamp, said device comprising:
   (a) a cylindrical integrator bar having a longitudinal axis and an input end for receiving light from said lamp, an output end, and side facets extending between the input and output ends, the input and output ends being planar and perpendicular to said axis;
   (b) the refractive index of the material of the integrator bar being greater than $\sqrt{2}$;
   (c) at least a portion of an edge bounding the output end of the bar being rendered imperfect whereby light incident on the imperfection may exit the bar through the imperfection or through a side facet of the bar after reflection internally at the imperfection;
   (d) an opaque housing around said bar and bounding a space outside said bar, said housing having inlet and outlet apertures allowing light from the lamp to enter input end of the bar and light leaving the output end of the bar to leave the housing, the housing being sealed to the bar at its input and output ends whereby light passing inwardly through the inlet aperture or outlet aperture respectively cannot enter the space outside the bar within the housing other than through the bar;
   (e) means masking the output end of the bar so that any light entering the outlet aperture is not incident on the imperfection; and
   (f) means for detecting light in the space within the housing which has left the bar by virtue of its incidence on the imperfection and for creating a signal indicative of the intensity of the detected light.

2. An illumination device as claimed in claim 1, wherein the integrator bar is a parallelepiped and
   (a) all four edges of the output end of the bar are imperfect; and
   (b) said photosensitive device is so positioned as to view one of said imperfect edges.

3. An illumination device as claimed in claim 1 or 2, wherein
   (a) a portion of said housing adjacent said outlet aperture constitutes said means masking the output end of said bar.

4. An illumination device including
   (a) a lamp for producing light;
   (b) a light integrating bar having input and output ends, said lamp being so disposed relative to said input end that light from said lamp enters said bar through said input end, the bar being so formed that substantially all of the light which enters the input end thereof exits the output end thereof;
   (c) at least a portion of an edge bounding the output end of the bar being rendered imperfect whereby light incident on the imperfection may exit the bar through the imperfection or through a side facet after reflection internally at the imperfection; and
   (d) means for detecting exclusively light which has exited said bar by virtue of its incidence on the imperfection and for creating a signal indicative of the intensity of the detected light.

5. The device claimed in claim 4, wherein
   (a) said means for detecting exclusively light which has exited said bar by virtue of its incidence on the imperfection includes an opaque housing and a photosensitive device, said opaque housing preventing light other than light which has exited said bar by virtue of its incidence on the imperfection being incident on said photosensitive device.

6. A self-measuring illumination device comprising:
   (a) a light integrating bar having input and output ends, the bar being so formed that substantially all of the light which enters the input end thereof exits the output end thereof,
   (b) a substantially opaque housing containing therewithin said light integrating bar, said housing having inlet and outlet apertures for passage therethrough, respectively, of light into and out of the light integrating bar,
   (c) an imperfection of an edge of the output end of said bar for enabling a small fraction of the light which entered the input end of the bar to escape said bar other than through the output end to thereby illuminate the interior of said housing,
   (d) means for masking said imperfection whereby light outside said bar and from outside said housing is prevented from being incident on said imperfection; and
   (e) photoresponsive means adapted to receive light illuminating the interior of said housing and for producing a signal related to the intensity of illumination within said housing.

7. The device of claim 6, wherein
   (a) said light integrating bar is of a parallelepidel form, and
   (b) the refractive index of said bar is greater than the square root of two.

* * * * *